July 18, 1950 C. H. SMITH, JR., ET AL 2,515,271

MULTIVIBRATOR COUNT DOWN CIRCUITS

Filed April 28, 1945 2 Sheets-Sheet 1

Inventor

CARL H. SMITH, JR.
CONRAD H. HOEPPNER

By Ralph L. Chappell

Attorney

July 18, 1950

C. H. SMITH, JR., ET AL 2,515,271

MULTIVIBRATOR COUNT DOWN CIRCUITS

Filed April 28, 1945

2 Sheets-Sheet 2

Inventor

CARL H. SMITH, JR.
CONRAD H. HOEPPNER

By Ralph L. Chappell

Attorney

Patented July 18, 1950

2,515,271

UNITED STATES PATENT OFFICE 2,515,271

MULTIVIBRATOR COUNT DOWN CIRCUITS

Carl H. Smith, Jr., Arlington, Va., and Conrad H. Hoeppner, Washington, D. C.

Application April 28, 1945, Serial No. 590,861

4 Claims. (Cl. 250—36)

(Granted under the act of March 3, 1883, as amended April 30, 1928; 370 O. G. 757)

This invention relates in general to an electronic frequency divider and in particular to one wherein the ratio of the input frequency to the output frequency is maintained constant over a wide range variation in the former.

It is an object of this invention to provide a frequency divider circuit wherein each output signal from the circuit appears in time coincidence wits the input signal which initiates the frequency division cycle.

It is another object of this invention to provide a frequency divider circuit of the foregoing type with additional means provided for maintaining a constant frequency division factor over a wide range of input signal frequencies.

Another object of this invention is to provide a frequency divider circuit whose output frequency will change in accordance with the input frequency and in such a manner that the output frequency will not exceed a certain maximum value.

Another object of this invention is to provide a signal responsive device for producing a symmetrical square-wave voltage at the frequency of an applied signal.

Another object of this invention is to provide a means in the foregoing device for maintaining a symmetrical output wave over a wide range of variation in the frequency of the applied signal.

Other objects and features of the present invention will become apparent upon a careful consideration of the following detailed description when taken with the accompanying drawings.

Figure 1:
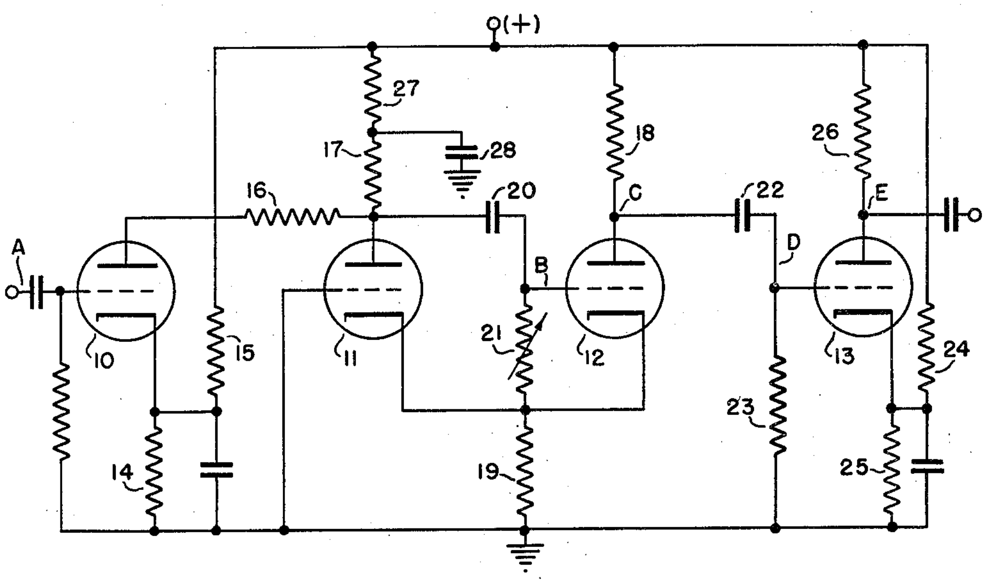
Fig. 1 is a schematic diagram showing the preferred embodiment of the invention.

For purposes of illustration a frequency-dividing circuit of a type especially adapted for pulse operation is shown in Fig. 1. This circuit comprises a first clipper-amplifier 10, a multivibrator including tubes 11 and 12, and a second clipper-amplifier 13. It is to be understood that this arrangement is representative of a preferred embodiment of the invention and may be modified in various respects without departing from the spirit of the invention. For example, in Fig. 1 the multivibrator is represented as being of the cathode coupled variety when actually it is only necessary that it be of the type which has one stable electrical state but will support for a predetermined period of time and in response to an input signal a second electrical state. Furthermore, if desired, the arrangement may be driven from a sine wave source in lieu of the pulse source drive as hereinafter described and shown.

In the case where the frequency divider is driven from a pulse source, a series of positive pulses obtained from the source, not shown, is applied to the grid of the clipper-amplifier 10. This tube serves primarily as a means for shaping and polarizing the input signal applied to the multivibrator. To this end tube 10 is normally operated below cut-off potential by means of the positive bias voltage applied to its cathode through the voltage-dividing resistances 14 and 15. To couple the output from tube 10 to the multivibrator, a resistance 17 is inserted in the plate circuit of both tube 10 and tube 11. Then the positive pulses obtained from the pulse source and applied to tube 10, if of sufficient amplitude to raise the grid of the latter above its cut-off potential, will cause a pulsating plate current to pass through the tube. This pulsating current produces at the plate of tube 11, due to the resistance 17, a series of negative voltage pulses which are applied through capacitance 20 to the grid of tube 12 in the multivibrator circuit, instituting a change in the electrical state of the multivibrator. As will be seen hereinafter, this change in the electrical state of the multivibrator represents the start of the frequency division cycle. To prevent the operation of tube 10 from affecting the performance of the multivibrator, an isolating resistance 16 of, for example, the same magnitude as resistance 17 is inserted between the plates of tubes 10 and 11.

In the present case the initial or stable state of the multivibrator exists when tube 12 is conducting and tube 11 is non-conducting. To this end the plate resistance 18 of tube 12 and the common cathode resistance 19 of tube 11 and 12 are chosen so that in the quiescent state conduction by tube 12 produces a positive potential at the cathodes of tubes 11 and 12 which is of sufficient magnitude to prevent conduction by tube 11. With this arrangement existing in the multivibrator a negative pulse applied to the grid of tube 12 through capacitance 20, if of sufficient amplitude to stop the flow of current through tube 12, will lower the potential at the cathode of tube 11 and thereby cause that tube to conduct. The resulting drop in potential at the plate of tube 11 is applied through capacitance 20 to drive the grid of tube 12 further beyond cut-off potential. Capacitance 20 then begins as exponential discharge through tube 11 and resistance 21 permitting a gradual rise in the potential on the grid of tube 12. Eventually the grid of tube 12 rises to cut-off potential and tube 12 returns to conduction. The period for which tube 12 is held non-conducting is dependent upon two factors, namely, the time constant of the discharge path of capacitance 20 and the magnitude of the drop in potential at the plate of tube 11 as conduction by that tube is initiated.

Frequency division is thus accomplished in the multivibrator with the non-conducting period of tube 12 governing the frequency division factor. To regulate the frequency division factor of the system the grid coupling resistance 21 of tube 12 is made variable and therefore the cut-off period of this tube is made variable. To illustrate more precisely the operation of the circuit, reference is had to the waveforms shown in Fig. 2. Waveform A is representative of the input signal applied to the grid of tube 10. Waveform B is representative of the grid voltage variation of tube 12. As shown, the initial pulse in waveform A triggers the multivibrator to cut-off tube 12. Thereafter seven additional pulses occur during the period that tube 12 is non-conducting. At some instant between the eighth and ninth pulses the tube 12 returns to conduction only to be again cut-off by the ninth pulse. A frequency division factor of 8 is thus obtained.

Figure 2:
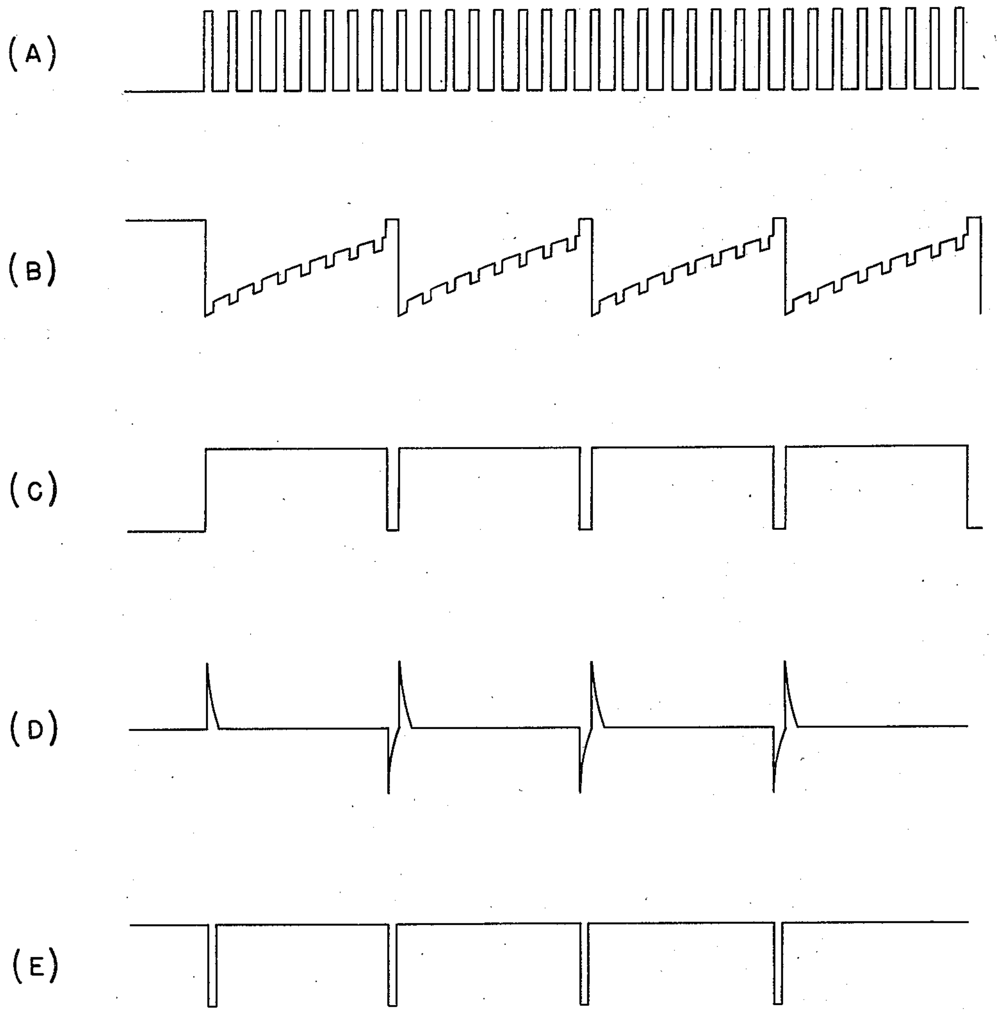
Fig. 2 is a series of waveforms illustrative of the action of the circuit of Fig. 1 when operating as a frequency divider.

As aforementioned, one of the objects of the invention is to provide a frequency divider system wherein the output signal occurs in time coincidence with the start of the frequency division cycle. For this purpose the output of tube 12 is applied through a differentiating circuit comprising capacitance 22 and resistance 23 to the grid of a second clipper-amplifier 13. As tube 12 passes from conduction to non-conduction and back again, the voltage at its plate will vary due to the plate load resistance 18 in a manner somewhat as shown by waveform C in Fig. 2. As shown in this waveform, the voltage at the plate of tube 12 rises positively at the start of each frequency division cycle and falls negatively at the end of each division cycle. When such a voltage wave is subjected to differentiation, as by the circuit comprising capacitance 22 and resistance 23, a voltage variation, such as that shown by waveform D, will appear across the resistance. This voltage is applied to the grid of tube 13. Tube 13 is normally operated below cut-off potential by means of a positive voltage maintained at its cathode by the voltage-dividing resistances 24 and 25. Therefore only the positive peaks of waveform D, which correspond to the return to non-conduction of tube 12, will cause tube 13 to conduct. Waveform E in Fig. 2 is illustrative of the output signal from the circuit as taken at the plate of tube 13 across resistance 26.

As may be observed from waveforms B, C, D, and E, this output signal is in time coincidence with the start of each frequency division cycle and is therefore in time coincidence with a pulse of the input signal.

Means are further provided in the multivibrator for maintaining a relatively constant frequency division factor despite changes in the input signal frequency. Broadly this means functions in response to changes in the input signal frequency, controlling the potential below cut-off to which the grid of the normally conducting tube, in the present illustration tube 12, is driven and thereby the period during which this tube is held non-conducting. In operation, any change in the frequency of the input signal alters, as hereinafter described, and in an inverse sense the potential below cut-off to which the grid of tube 12 is driven.

In particular this compensating action is achieved through a filtering circuit which in the present case comprises capacitance 28 in combination with resistances 17, 27 and the plate resistance of tube 11. The time constants of the charge and discharge paths of this capacitance, determined respectively by resistance 27 and resistance 17 in combination with the plate resistance of tube 11, are made long with respect to the longest desired period between output pulses, which in effect is long compared to the time constant of the combination of resistance 21 and capacitance 20. Thus the potential at the juncture of resistances 17 and 27 is unable to change appreciably during any individual frequency division cycle.

To illustrate the corrective action, consider a case in which the frequency of the input signal has suddenly increased. This will not cause an immediate change in output signal frequency, but will result in a higher frequency division factor. Since, as previously shown by waveform B of Fig. 2, the maximum conduction period of tube 12 is that period between two consecutive input signals, this tube will conduct for a shorter period of time during each frequency division cycle. This results in a higher duty cycle (ratio of time conducting to time non-conducting) for tube 11. The higher average current drawn by tube 11 produces a greater voltage drop across resistance 27 lowering the potential at the juncture of resistances 17 and 27 and therefore the effective plate-supply voltage for the tube. This reduction in plate-supply voltage for tube 11 reduces the amplitude of the drop in potential produced at the plate of 11 as that tube goes from cut-off to conduction, consequently the grid of tube 12 is not driven so far negative and will therefore rise to cut-off potential in a shorter period of time. This reduces the number of input signals which can occur during any non-conducting period of tube 12, thereby restoring the frequency division factor to its former value.

This corrective action, however, cannot continue indefinitely. Eventually the plate voltage of tube 11 falls so low as to prevent a further substantial increase in plate current. The circuit is then forced to stabilize itself to a higher frequency division factor, automatically limiting the maximum output frequency.

It should be noted that, although the corrective action has been described for an instantaneous change in input frequency, normal changes in input frequency would be slow, usually occurring over a period longer than the time constant of the charge and discharge paths of capacitance 28. Therefore there will not normally be a change in the frequency division factor as relatively slow and moderate variations of input frequency are experienced.

A similar action takes place in the opposite direction upon decreases in the input signal frequency. In this case the voltage at the juncture point of resistances 17 and 27 increases to cause the grid of tube 12 to be driven further negative as tube 11 is rendered conducting. Here too, a limiting action is experienced, since it is impossible for the potential at the junction of resistances 17, 27 to rise above the plate-supply voltage.

By making slight changes in the time constants of some of the resistance-capacitance circuits in the circuit of Fig. 1, the latter may serve as a means for producing a symmetrical square-wave output voltage in synchronism with and at the frequency of an input signal. Furthermore, by the action of the filtering circuit this square-wave voltage output may be maintained symmetrical over a wide range of variations in the input signal frequency.

To achieve this result, the time constant of the discharge path of capacitance 20 is adjusted by means of the variable resistance 21 so that the cut-off period of tube 12 will be equal to the half period of the mean input signal frequency with the potential at the junction of 17 and 27 at approximately the mid-point in the corrective voltage range. Thus a 50 percent duty cycle will be maintained for both tubes 11 and 12 producing a symmetrical square wave at the plate of tube 12. In using the circuit as a square-wave generator, the circuit coupling the plate of tube 12 to the grid of tube 13, comprising capacitance 22 and resistance 23, is made of the long time-constant variety. As previously described, tube 13 is maintained in a normally cut-off condition by means of voltage-divider action between resistances 24 and 25. It becomes conducting during the period in which tube 12 is cut off and serves merely to clean up the square wave produced at the plate of tube 12.

In the production of the square wave by the multivibrator 11—12, tube 12, which in the quiescent state would be conducting as previously described, is cut off by a negative pulse from the plate of tube 11 produced as a result of the conduction current of tube 10 through the resistance 17. After a predetermined period equal in time to the half period of the desired square-wave output, tube 12 is returned to conduction by the discharge of capacitance 20. It then remains in this condition until cut off by a second negative pulse from the plate of tube 11.

To compensate for changes in the frequency of the input keying signal, the size of the elements in the filtering circuit are again chosen so that the time constants of both the charge and discharge paths of capacitance 28 are several times as long as the half period of the desired output square wave, or in effect the time constant formed by capacitance 20 and resistance 21.

To illustrate the compensating action of the filter circuit, consider the condition in which the frequency of the input signal has increased. This will not immediately affect the cut-off period of tube 12, since this is determined primarily by the discharge period of capacitance 20, but it will reduce the cut-off period of tube 11, thus increasing the average duty cycle of tube 11 and the average current drawn by that tube through resistance 27. This increased average current will lower the average potential existing at the junction of resistances 17 and 27 effectively lowering the plate-supply voltage for tube 11. Thus a smaller voltage drop will be produced at the plate of tube 11 as that tube goes from cut-off to conducting and thereby reducing the negative potential from which the grid of tube 12 must recover before that tube can begin conducting. The action is therefore to reduce the cut-off period of tube 12 so that an essentially square-wave output is again realized. A similar action in the opposite direction also ensues upon a decrease in the frequency of the input signal. For optimum performance of the circuit it is desirable to adjust the time constant associated with the discharge path of capacitance 20 so that tube 12 will, at the mid-point in the input frequency range, be cut off for the half period of the input trigger when the potential at the junction of 17 and 27 is at the mid-point in its corrective range.

Figure 3:
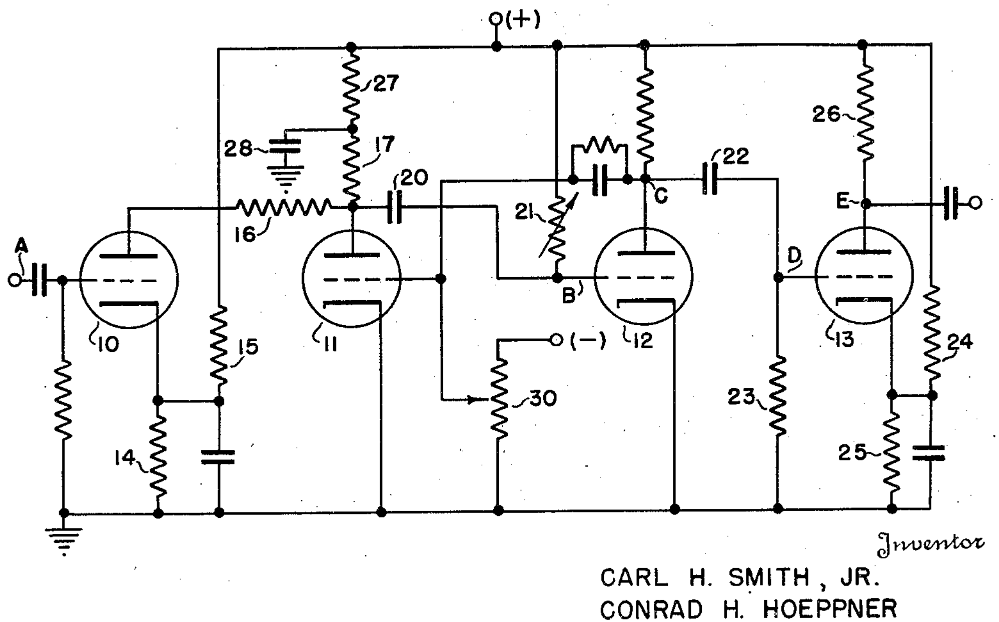
Fig. 3 is a schematic diagram of a typical modification of the invention.

An obvious modification of the circuit shown in Fig. 1 is disclosed in Fig. 3. The sole difference in the two circuits resides in the type of multivibrator used to accomplish the frequency division. In the case of the circuit shown in Fig. 3 the grid of tube 12 is returned to a positive potential through the variable resistance 21, while the grid of tube 11 is returned through potentiometer 30, to a source of negative biasing potential. Similarly the multivibrator supports but one stable state wherein tube 12 is conducting and tube 11 is non-conducting. Again a second state may be caused to exist for a finite period of time, wherein tube 11 is conducting and tube 12 is non-conducting. The period over which the latter state may exist is again dependent upon the time constant circuit comprising capacitance 20 and resistance 21 and the voltage variation produced at the plate of tube 11 as that tube passes from non-conduction to conduction.

From the foregoing description it is apparent that many modifications of the invention are possible without exceeding the spirit of the invention. Therefore this invention is not to be limited except as is necessitated by the spirit of the prior art.

The invention described herein may be manufactured and used by or for the Government of the United States of America for governmental purposes without the payment of any royalties thereon or therefor.

What is claimed is:

1. The combination, comprising a pair of tubes having at least a plate, cathode, and control grid electrodes with certain electrodes of one tube connected to certain electrodes of the other tube so as to form a multivibrator, said plate electrode of said other tube being the input terminal of said multivibrator, said multivibrator having one stable electrical state wherein said one tube is normally held conducting and said other tube non-conducting but will support for a finite period of time a second electrical state wherein said other tube is held conducting and said one tube non-conducting, said second electrical state being established in response to an input signal applied to said multivibrator to cause said other tube to conduct whereby the grid of said one tube, by the multivibrator action, is driven below cut-off and held there for a predetermined period of time, said predetermined period of time being in part a function of the voltage below cut-off that the grid of said one tube is driven, separate plate supply paths for said tubes, and a filter circuit connected in the plate supply path of said other tube and responsive to increases or decreases in the input signal frequency to inversely alter the voltage below cut-off to which the grid of said one tube is driven, said filter circuit having a large time constant relative to the period over which said second electrical state may exist.

2. The combination, comprising a pair of tubes having at least a plate, cathode, and control grid electrodes with certain electrodes of one tube connected to certain electrodes of the other tube so as to form a multivibrator, said multivibrator having one stable electrical state wherein said one tube is normally held conducting and said other tube non-conducting but will support for a finite period of time a second electrical state wherein said other tube is held conducting and said one tube non-conducting, said second electrical state being established in response to an input signal applied to said multivibrator to cause said other tube to conduct whereby the grid of said one tube, by the multivibrator action, is driven below cut-off and held there for a predetermined period of time, said predetermined period of time being in part a function of the voltage below cut-off that the grid of said one tube is driven, and a plate voltage supply path for said other tube, said path including a resistance-capacitance filter circuit operative to vary the voltage at the plate of this tube in a manner proportional to the ratio of the non-conducting time to the conducting time of this tube thereby to alter in a like manner the voltage below cut-off to which the grid of said one tube is driven, said filter circuit having a large time constant relative to the period over which said second electrical state may exist.

3. The combination, comprising a pair of tubes having at least a plate, cathode, and control grid electrodes with certain electrodes of one tube connected to certain electrodes of the other tube so as to form a multivibrator, said multivibrator having one stable electrical state wherein said one tube is normally held conducting and said other tube non-conducting but will support for a finite period of time a second electrical state wherein said other tube is held conducting and said one tube non-conducting, said second electrical state being established in response to an input signal applied to said multivibrator to cause said other tube to conduct whereby the grid of said one tube, by the multivibrator action, is driven below cut-off and held there for a predetermined period of time, said predetermined period of time being in part a function of the voltage below cut-off that the grid of said one tube is driven, and a resistance-capacitance filter circuit connected in the plate circuit of said other tube operative to vary the voltage at the plate of said other tube in a manner proportional to the ratio of the non-conducting period to the conducting period of this tube thereby to alter in a like manner the voltage below cut-off to which the grid of said one tube is driven, said filter circuit having a large time constant relative to the period over which said second electrical state may exist.

4. The combination comprising, a two tube trigger circuit of the type normally in a first state of conductivity but operative in response to an external signal to assume a second state of conductivity, each of said tubes having at least plate, grid, and cathode electrodes, a time constant circuit connecting the plate of one tube to the grid of the other to control the duration of said second state as a function of its time constant and the voltage applied to the plate of said one tube, a voltage supply source, and a filter circuit connected between said supply source and the plate of said one tube to vary the voltage applied to the plate of said one tube in accordance with changes in the relative time ratio of the two conductivity states, said filter circuit having a large time constant relative to the duration of the second state of conductivity.

CARL H. SMITH, Jr.
CONRAD H. HOEPPNER.

REFERENCES CITED

The following references are of record in the file of this patent:

UNITED STATES PATENTS

| Number | Name | Date |
|---|---|---|
| 1,672,215 | Heising | June 5, 1928 |
| 2,113,011 | White | Apr. 5, 1938 |
| 2,185,363 | White | Jan. 2, 1940 |
| 2,226,706 | Cawein | Dec. 31, 1940 |
| 2,377,894 | McCool | June 12, 1945 |
| 2,395,368 | Bull | Feb. 19, 1946 |
| 2,401,647 | Kahn | June 4, 1946 |

FOREIGN PATENTS

| Number | Country | Date |
|---|---|---|
| 485,934 | Great Britain | May 26, 1938 |